(12) United States Patent
Wilt et al.

(10) Patent No.: US 7,072,124 B2
(45) Date of Patent: Jul. 4, 2006

(54) LIGHT-WEIGHT HIGH RESOLUTION VIEWER

(75) Inventors: Brian L. Wilt, Madison, WI (US); Patrick J. Shipley, Sun Prairie, WI (US); Jeffrey M. Hoffman, Tucson, AZ (US); Jasmin Côté, Île Bizard (CA)

(73) Assignee: Kerr Corporation, Orange, CA (US)

( * ) Notice: Subject to any disclaimer, the term of this patent is extended or adjusted under 35 U.S.C. 154(b) by 0 days.

(21) Appl. No.: 10/602,128

(22) Filed: Jun. 24, 2003

(65) Prior Publication Data

US 2004/0263954 A1 Dec. 30, 2004

(51) Int. Cl.
*G02B 13/00* (2006.01)
*G02C 1/00* (2006.01)

(52) U.S. Cl. .................. 359/744; 359/362; 359/642; 351/158

(58) Field of Classification Search ........ 359/362–417, 359/744, 800–819, 642–647; 351/156–160 H, 351/41

See application file for complete search history.

(56) References Cited

U.S. PATENT DOCUMENTS

| | | | |
|---|---|---|---|
| 3,273,456 A | 9/1966 | Feinbloom | 359/481 |
| 4,013,340 A * | 3/1977 | Mukai et al. | 359/417 |
| 4,224,626 A * | 9/1980 | Sternberg | 343/911 R |
| 4,818,046 A * | 4/1989 | Kondo | 359/206 |
| 4,833,890 A * | 5/1989 | Kelman | 623/6.17 |
| 4,865,438 A * | 9/1989 | Wada | 351/158 |
| 4,979,332 A * | 12/1990 | Nagaya et al. | 47/69 |
| 5,422,793 A * | 6/1995 | Kobayashi | 362/538 |
| 5,428,474 A | 6/1995 | Murphy | 359/361 |
| 5,463,500 A | 10/1995 | Buchroeder | 359/744 |
| 5,515,209 A | 5/1996 | Buchroeder et al. | 359/744 |
| 5,627,690 A | 5/1997 | Caplan et al. | 359/362 |
| 5,680,194 A | 10/1997 | Pasfield | 351/158 |
| 5,680,195 A * | 10/1997 | Pekar et al. | 351/158 |
| D385,899 S * | 11/1997 | Murphy et al. | D16/330 |
| 5,694,193 A | 12/1997 | Murphy et al. | 351/58 |
| 5,734,500 A | 3/1998 | Gebelein | 359/419 |
| 5,748,390 A * | 5/1998 | Koiwai et al. | 359/811 |
| 5,774,201 A * | 6/1998 | Tackles | 351/159 |
| 5,790,323 A | 8/1998 | Caplan et al. | 359/744 |
| 5,900,922 A * | 5/1999 | Moore | 351/103 |
| 6,061,189 A | 5/2000 | Caplan et al. | 359/744 |
| 6,157,501 A * | 12/2000 | Sato et al. | 359/819 |
| 6,163,413 A | 12/2000 | Caplan et al. | 359/744 |
| 6,201,640 B1 | 3/2001 | Caplan et al. | 359/418 |

\* cited by examiner

*Primary Examiner*—Thong Q Nguyen
(74) *Attorney, Agent, or Firm*—Wood Herron & Evans, LLP

(57) ABSTRACT

A magnification loupe carried by spectacles has a Galilean lens system comprising a single-element eyepiece lens and a two-element objective lens. The loupes may be mounted to eyeglass frames by a flip-up mounting member, or they may be mounted through the eyeglass lenses of the spectacles. The loupes provide high magnification while minimizing weight to thereby reduce strain and discomfort to users. In an exemplary embodiment, the objective lens has a non-circular shape that provides a wide field of view while further minimizing the weight of the loupe. A correction lens may be interchangeably coupled to the loupe housing to permit selective replacement with another correction lens to vary the working distance of the loupe.

4 Claims, 6 Drawing Sheets

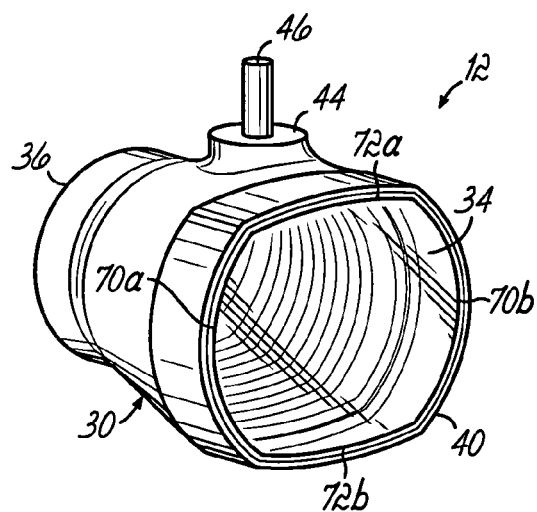
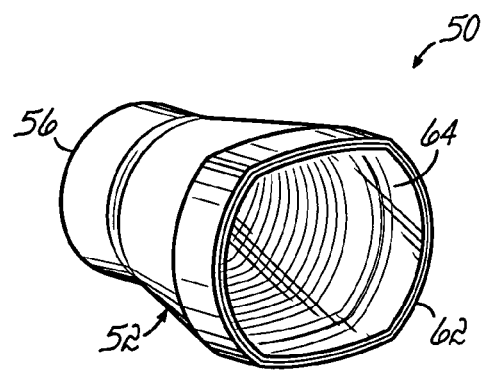
FIG. 3A  FIG. 3B
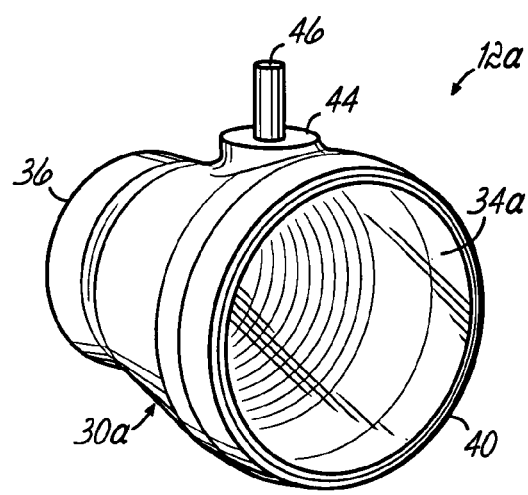
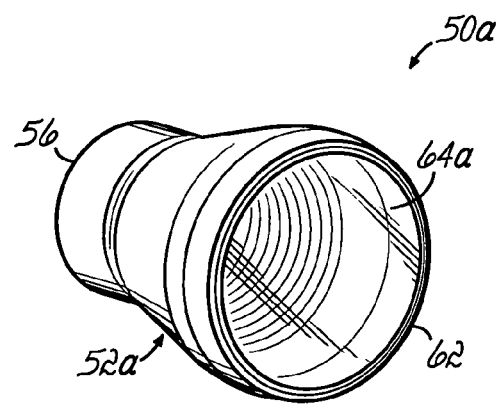
FIG. 4A  FIG. 4B

LIGHT-WEIGHT HIGH RESOLUTION VIEWER

FIELD OF THE INVENTION

The present invention relates generally to optical instruments, and more particularly to magnification viewers, such as those worn by surgeons and dentists.

BACKGROUND OF THE INVENTION

Magnification viewers are well known in the art and generally comprise one or more optical loupes coupled to eyeglass frames. These magnification viewers are often worn by dentists and surgeons for extended periods of time during clinical procedures so as to provide clarity of view while avoiding a "hunched over" position that can result in debilitating neck and back strain, and which can, in turn, have an adverse effect on the success of the operation. By permitting the clinician to operate at a greater working distance from the patient, higher magnification viewers also reduce the clinician's exposure to potential contamination from aerosols.

Because clinicians use magnification viewers during surgery and other procedures requiring manual precision, it is important that they be light-weight, comfortable, and provide good clarity and a wide field of vision while providing high resolution.

The optical loupes of clinical magnification viewers are generally made according to the Galilean telescope design, having a single objective lens and a single eyepiece lens. Galilean telescopes are characterized by relatively narrow fields of view that are mainly limited by the diameter of the objective lens. The basic Galilean design, however, produces substantial chromatic aberration ("coloring") and, hence, poor image quality.

Since the optical loupes should be kept as short as possible to reduce torque on the nose and general wearer discomfort, an eyepiece with a shorter focal length is usually employed when an increase in magnification is desired. However, to retain a good field of view without vignetting, the diameter of the objective must also be increased. If this is done while keeping the focal length of the objective the same, the "speed" of the lens increases, resulting in a lower resolution quality. It also mandates an excessively large package. One method of overcoming the "speed" problem is to use a more complicated objective lens, though at a cost of greatly increased weight and, therefore increased strain and discomfort to the wearer.

The so-called "Kellner design" (from Kellner, U.S. Pat. No. 1,197,742) in general use today contains a heavy doublet objective and a singlet eyepiece lens. While image quality is adequate at lower magnifications, excessive coloring results in poor image quality at higher magnifications. Moreover, the field of view is relatively limited in Kellner lens systems.

It is known that image quality of prior art magnification viewers can be enhanced by the use of "very high index flint glass." However, this method has not been in general use, since "very high index flint glass" generally makes the viewer too heavy for practical use. Prior art magnification viewers also require lens mounting barrels of differing sizes in order to provide a wide range of focusing or working distances. As such, the manufacturing costs for these types of prior art viewers are relatively high.

There is thus a need for an improved magnification viewer capable of providing increased magnification while overcoming drawbacks of prior art viewers, such as those described above.

SUMMARY OF THE INVENTION

The present invention provides a magnification viewer having a lightweight magnification loupe providing increased magnification with an improved image quality. In an exemplary embodiment, the loupe includes a Galilean lens system, having a single-element eyepiece lens and a two-element objective lens. The loupe can be carried on a pair of eyeglasses, or other user wearable device, either by mounting to a flip-up mounting member secured to the bridge of the eyeglass frames, or by mounting through the eyeglass lenses.

In one aspect of the invention, the objective lens of the loupe has a non-circular shape, wherein adjacent pairs of oppositely disposed peripheral edges of the lens are defined by arcs having different length radii. The non-circular shape helps to minimize the weight of the loupe by reducing the overall size of the lenses while not adversely affecting the field of view. In one embodiment, a first pair of peripheral edges are defined by a first radius extending from the center of the lens, and a second pair of peripheral edges are defined by at least one second radius that extends from a point that is not coincident with the lens center. In another exemplary embodiment, the peripheral edges have a semi-elliptical shape, wherein the second pair of peripheral edges correspond to the periphery of an ellipse.

In another aspect of the invention, the loupe includes a correction lens that is removably mounted in the loupe housing. The correction lens can be removed from the housing and interchangeably replaced with a different correction lens to thereby vary the working distance of the loupe. Advantageously, the interchangeable correction lens allows the loupe to accommodate a range of working distances by selective replacement of a single element that is relatively inexpensive to manufacture. When the loupes are provided in a through-the-lens arrangement, the correction lens may be provided as a prescription lens to permit the loupes to be customized to a user's optical prescription.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 3A is a perspective view of an exemplary optical loupe of the present invention configured for mounting to a flip-up mounting member;

FIG. 3B is a perspective view of another exemplary loupe of the present invention configured for mounting through an eyeglass lens;

FIG. 4A is a perspective view of another exemplary loupe configured for mounting to a flip-up mounting member;

FIG. 4B is yet another exemplary loupe configured for mounting through an eyeglass lens;

DETAILED DESCRIPTION

Figure 1:
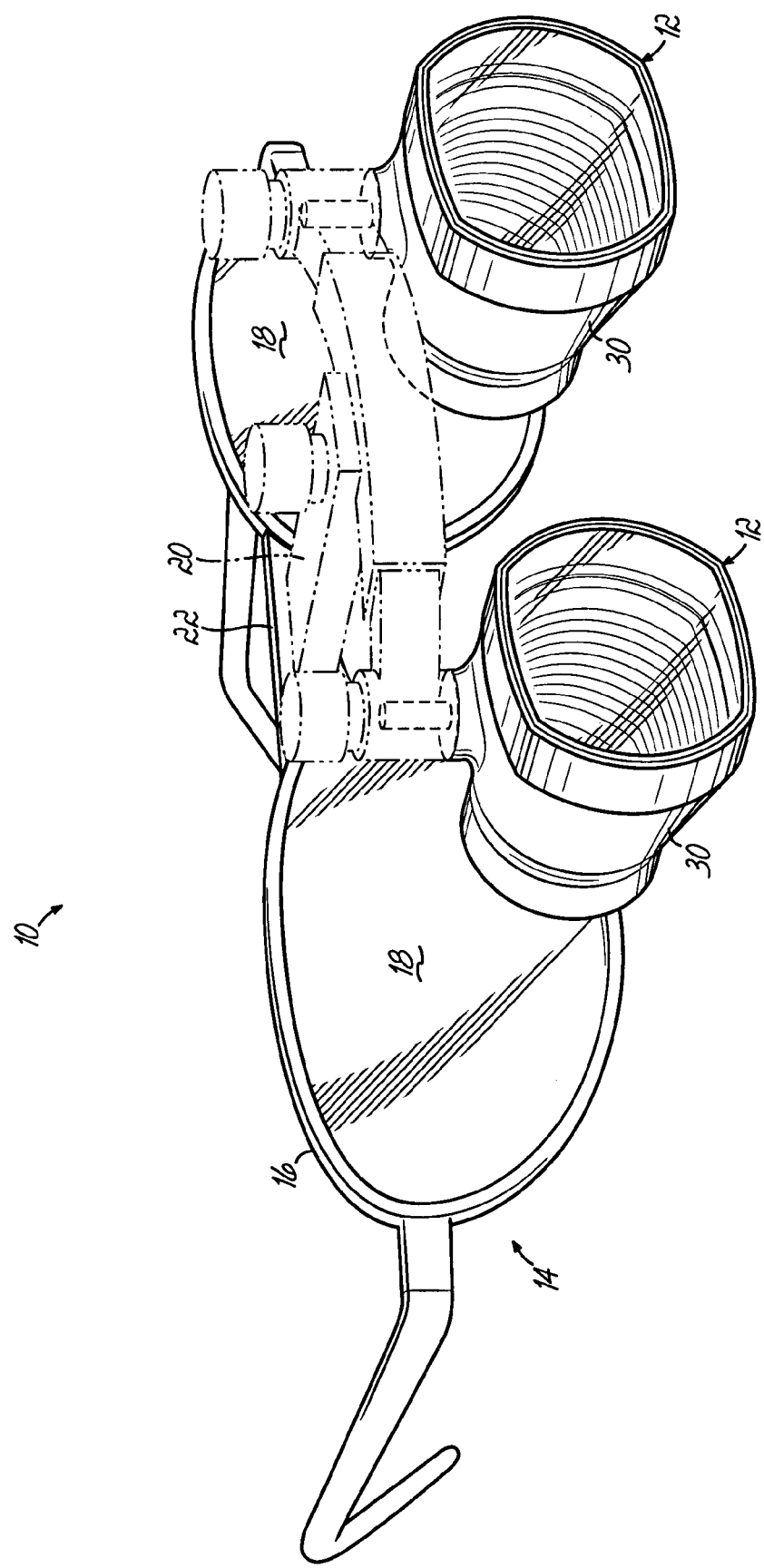
FIG. 1 is a perspective view of a magnification viewer including exemplary optical loupes according to the present invention.

Referring to FIG. 1, there is shown a magnification viewer 10 having an exemplary magnification loupe 12 according to the present invention. The magnification viewer 10 comprises a pair of spectacles 14 having eyeglass frames 16 for supporting a pair of eyeglass lenses 18 as known in the art. The magnification viewer 10 further includes first and second magnification loupes 12 secured to the eyeglass frames 16 such as by a flip-up mounting member 20 coupled to a bridge 22 of the eyeglass frames 16. Advantageously, the loupes 12 may be pivoted by the mounting member 20 to be positioned in front of the respective eyeglass lenses 18 whereby a user may view a highly magnified image of an object positioned in front of the magnification viewers 10. Advantageously, the magnification loupes 12 are also pivotally secured to the flip-up mounting member 20 to permit adjustment of the convergence angle of the magnification viewer.

Figure 5:
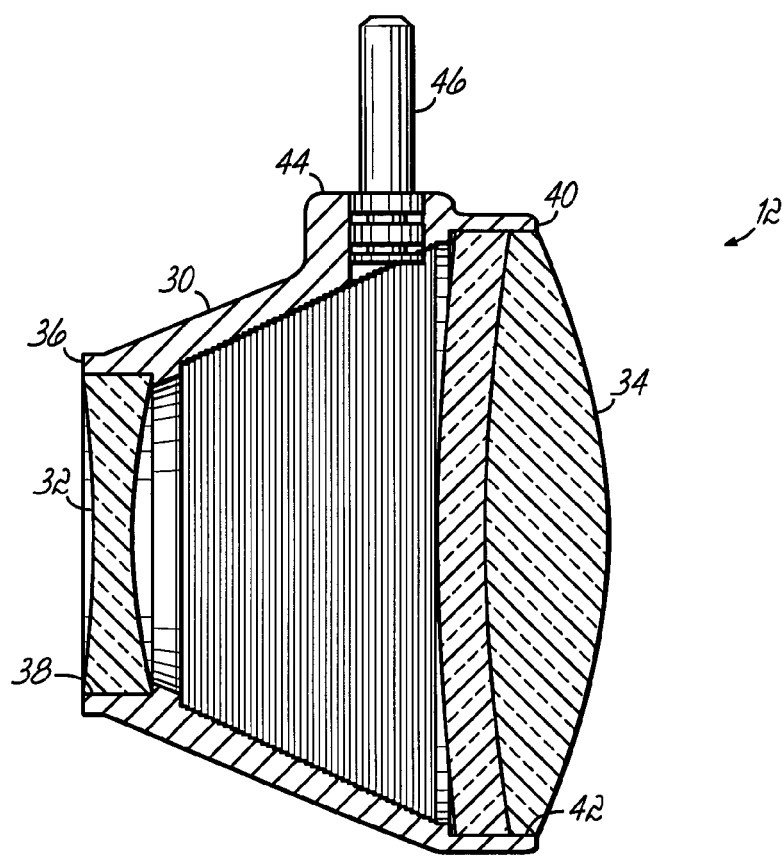
FIG. 5 is a cross-sectional view depicting an exemplary flip-up loupe of the present invention.

Referring now to FIGS. 3A and 5, the exemplary magnification loupe 12 of FIG. 1 is shown in greater detail. The magnification loupe 12 comprises a housing 30 for supporting the lens elements 32, 34 of the loupe. A first end 36 of the housing 30 has a first aperture 38 for receiving and supporting an eyepiece lens 32. The second end 40 of the housing 30 includes a second aperture 42 sized to receive and support an objective lens 34 of the loupe 12. In the exemplary embodiment shown, the eyepiece lens 32 comprises a single lens element and the objective lens 34 comprises a two-piece lens element. A mounting pylon 44 extends from an outer surface of the housing 30 and supports a threaded stud 46 which may be coupled to the flip-up mounting member 20 to permit pivotal adjustment of the magnification loupes 12 to vary the convergence angle of the magnification viewer 10. Advantageously, the objective lens 34 and eyepiece lens 32 of the magnification loupe 12 cooperate to focus light entering through the objective lens 34 and passing through the eyepiece lens 32 and eyeglass lens 18 to provide a magnified image of an object disposed in front of the loupes 12.

Figure 7:
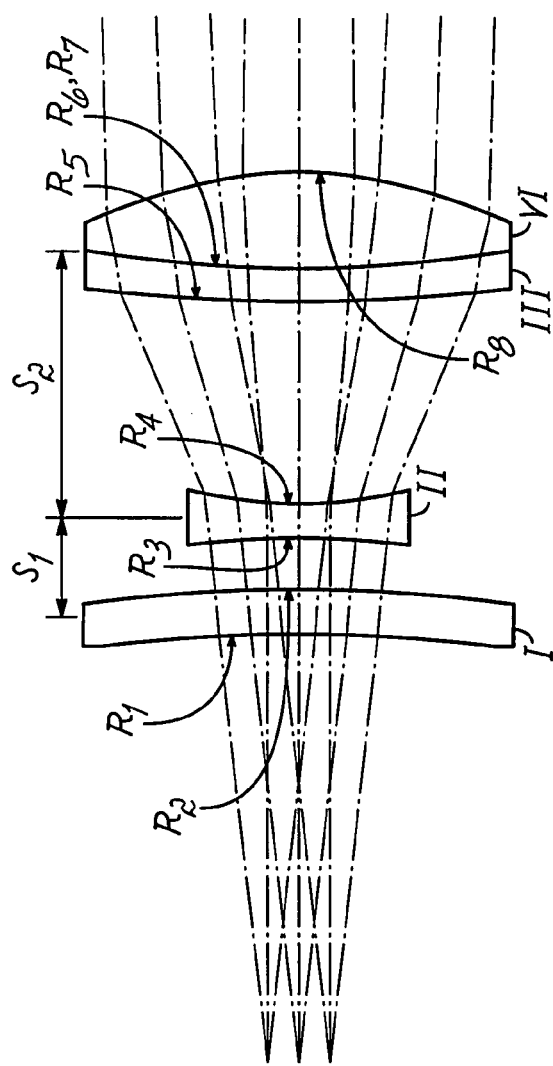
FIG. 7 is a schematic diagram illustrating the lens parameters for a flip-up optical loupe of the present invention.

FIG. 7 is a schematic illustration of the flip-up optical loupe lens system, together with an eyeglass lens 18. Exemplary construction data for a magnification viewer built according to a preferred embodiment of the invention is provided in Table 1 below, with respect to the nomenclature of FIG. 7.

TABLE 1

| | | Flip-up | | | | | |
|---|---|---|---|---|---|---|---|
| Element | Glass | $\eta^d$ | $v_d$ | Radius | Thickness | Diameter | Sep. |
| I | Schott NSK5 | 1.589 | 61.3 | $R_1$ = 98.19 $R_2$ = 98.19 | 3.0 | 25.4 | |
| II | Schott NBALF4 | 1.580 | 53.9 | $R_3$ = 52.10 $R_4$ = 20.16 | 1.5 | $D_1$ = 13.00 $D_2$ = 13.25 | $S_1$ = 4.1 |
| III | O'Hara STIH23 | 1.785 | 26.3 | $R_5$ = 85.68 $R_6$ = 43.17 | 1.8 | 26.15 | $S_2$ = 13.59 |
| IV | Schott NBK7 | 1.517 | 64.2 | $R_7$ = 43.17 $R_8$ = 22.39 | 7.6 | 26.15 | |

In Table 1, the radius, thickness, diameter, and separation dimensions are given in millimeters, Roman numerals identify the lens elements in their respective order from the eyepoint side to the object side. $\eta_d$ represents the refractive index of each element; $v_d$ is the abbe dispersion number; $R_1$, $R_2$, etc. represent the radii of the respective refractive surfaces in order, from the eyepoint side to the object side; $D_1$, $D_1$ etc. represent the maximum clear lens aperture diameters of the parent lens elements; and $S_1$, $S_2$ represent the air space between the elements, measured along the optical centerline. In this example, lens element I represents a zero-power eyeglass lens having a base curve of six diopters. It will be recognized by those skilled in the art that other eyeglass lenses may be substituted for the selected eyeglass lens, with minimal affect on the performance of the magnification loupe.

Figure 2:
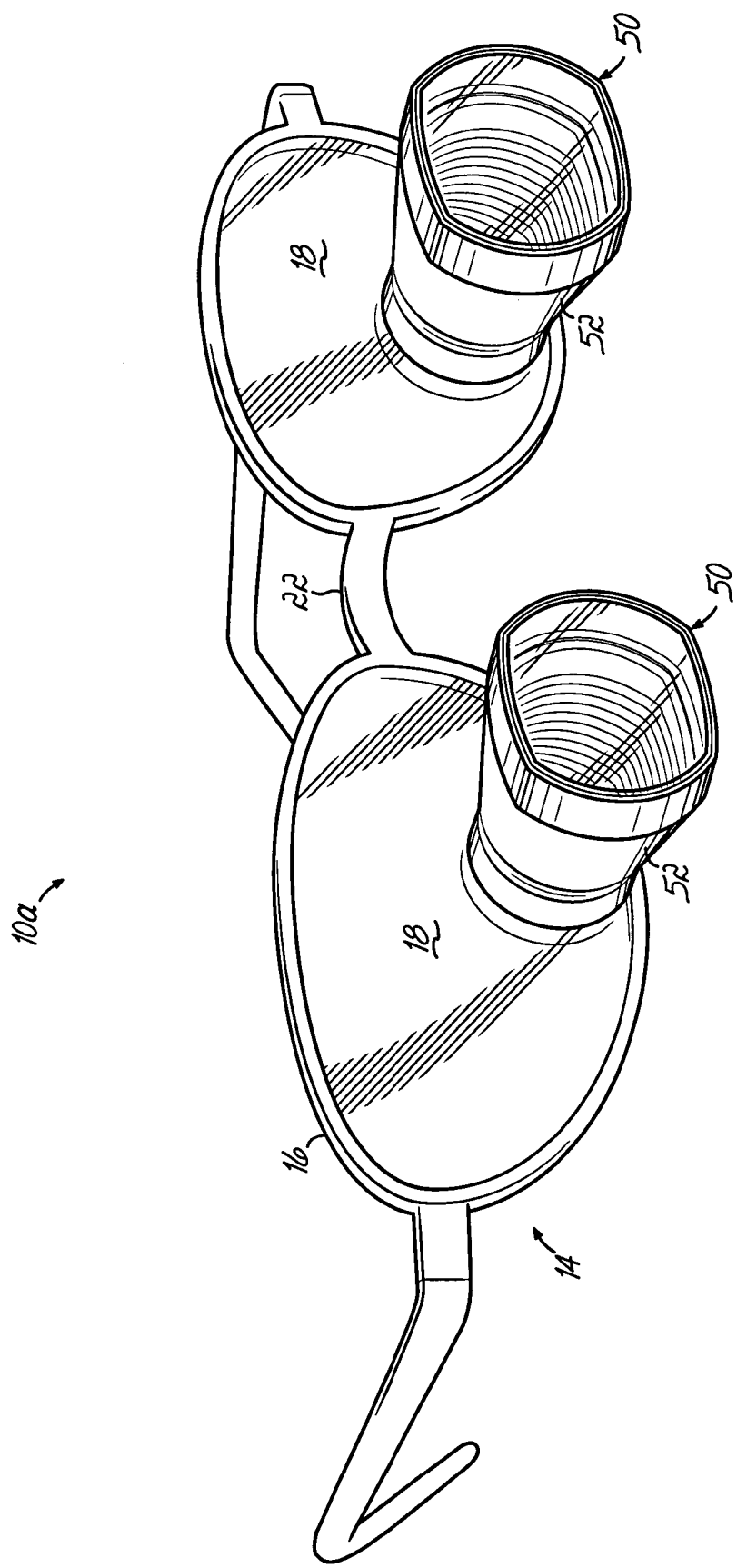
FIG. 2 is a perspective view of another magnification viewer wherein the exemplary optical loupes are mounted through the lenses of a pair of eyeglasses.
Figure 6:
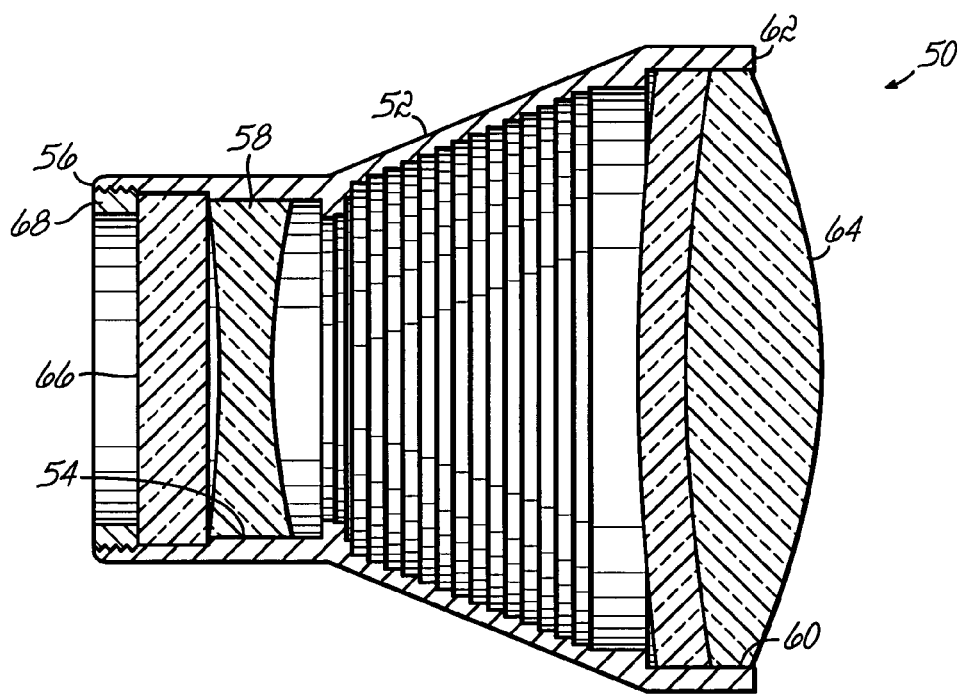
FIG. 6 is a cross-sectional view depicting an exemplary through-the-lens loupe according to the present invention.

Referring now to FIG. 2, there is shown another magnification viewer 10a having an exemplary magnification loupe 50 of the present invention configured for mounting through the eyeglass lens elements 18 of a pair of eyeglasses 14. Referring further to FIGS. 3B and 6, the exemplary magnification loupe 50 depicted in FIG. 2 comprises a housing 52 having a first aperture 54 at a first end 56 for supporting an eyepiece lens element 58 and a second aperture 60 at a second end 62 for supporting a two-piece objective lens element 64, similar to the magnification loupe 12 depicted in FIGS. 1, 3A and 5. However, because this magnification loupe 50 is mounted through the eyeglass lens 18, the loupe 50 further includes a correction lens 66 mounted in the first aperture 54 of the housing 52, adjacent the eyepiece lens 58. The correction lens 66 may be selected to correspond to a prescription required by an individual user.

Advantageously, the correction lens 66 is removably coupled to the housing 52, whereby the correction lens 66 may be selectively removed from the housing 52 and replaced with a different correction lens having a different spherical curve to thereby vary the working distance of the loupe 50. The correction lens 66 may be manufactured from relatively inexpensive prescription lens elements that have been cut down to the necessary diameter to be received in the loupe housing 52. The interchangeability of correction lens 66 thus permits ready adjustment of the magnification loupe 50 to accommodate various working distances without the need to maintain and replace expensive, precision ground eyepiece or objective lens elements. Accordingly, multiple correction lens elements 66 may be used with a single set of eyepiece lenses 58 and objective lenses 64 supported in a housing 52 to provide magnification loupes 50 which may be easily converted for use at various working distances.

Alternatively, the correction lens 66 may be provided according to a user's optical prescription to serve as a corrective lens. This permits the loupes to be customized for the vision correction of the user.

In the exemplary embodiment shown, correction lens 66 is secured within the loupe housing 52 by a retaining ring 68 that is threadably engageable with the first end 56 of the housing 52. The correction lens may thereby be easily removed and replaced by unthreading the retaining ring 68 using, for example, a tool (not shown) configured to engage the retaining ring 68. While the magnification loupe 50 has been shown and described herein as having a retaining ring 68 to permit selective replacement of the correction lens 66, it will be understood that the correction lens 66 may be retained within loupe housing 52 in various other ways, including use of a snap fit arrangement, press fitting the correction lens within the housing 52, or other configurations and structure that would permit removal and replacement of the correction lens 66.

Figure 8:
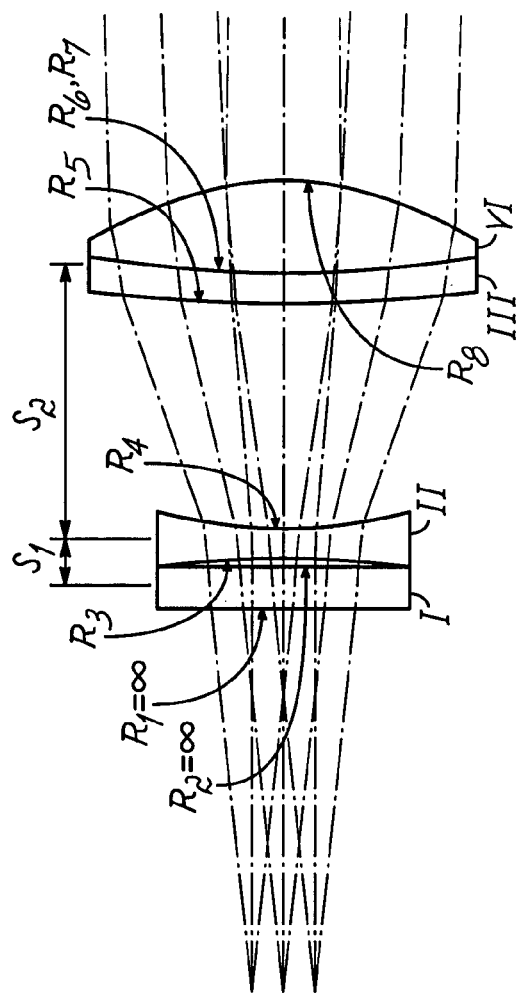
FIG. 8 is a schematic diagram illustrating the lens parameters for an exemplary through-the-lens optical loupe of the present invention.

Referring now to FIG. 8, there is shown a schematic diagram of the lens elements for the magnification loupe 50 shown in FIGS. 2, 3B and 6. Exemplary construction data for a magnification loupe 50 built according to a preferred embodiment are given in Table 2.

Figure 9:
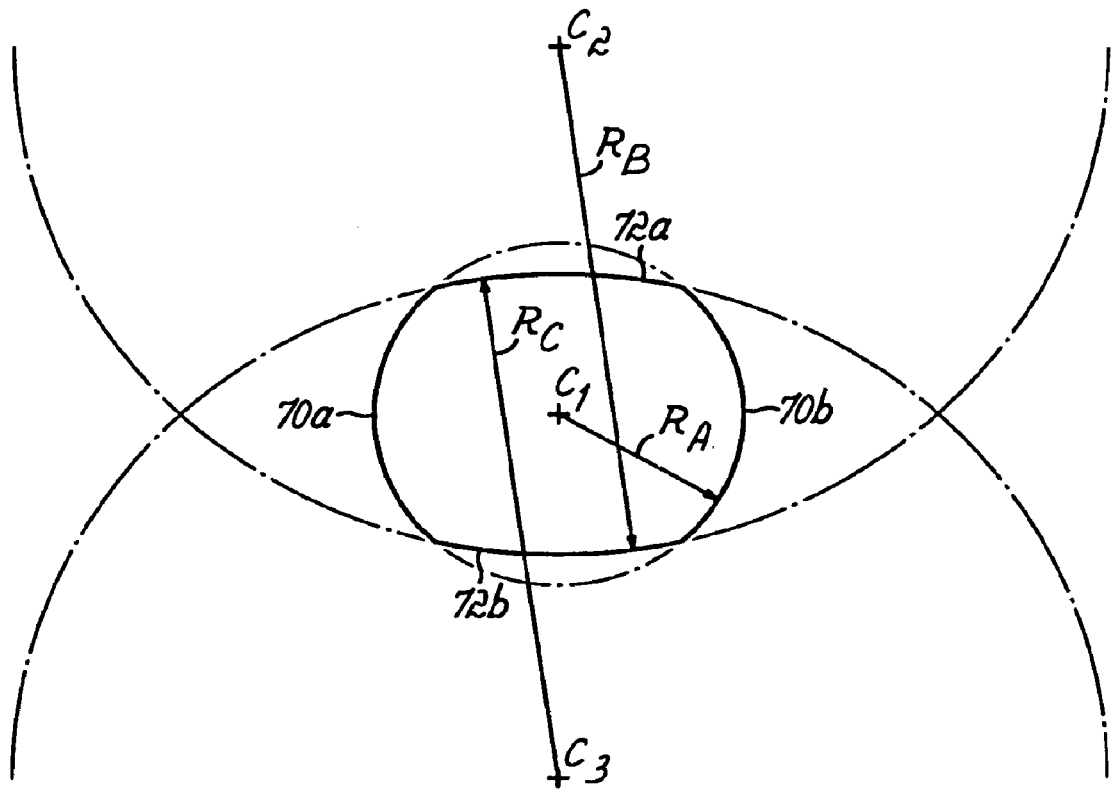
FIG. 9 is a schematic illustration depicting the shape of an objective lens according to the present invention.

The magnification loupes 12 shown in FIGS. 1, 2 and 3A–3B include objective lenses 34, 64 having a non-circular shape, as depicted schematically in FIG. 9. In particular, first oppositely disposed peripheral edges 70a, 70b of the objective lens 34, 64 are circular in shape and are defined by a common radius Ra extending from a center C1 of the lens. Second oppositely disposed peripheral edges 72a, 72b of the objective lens 34, 64, adjacent the first peripheral edges 70a, 70b, comprise arcs which are not defined by the radius Ra of the first peripheral edges 70a, 70b. Rather, the second peripheral edges 72a, 72b are defined by at least one second radius Rb, Rc extending from at least one center point C2, C3 that is not coincident with the center C1 of the objective lens.

Figure 10:
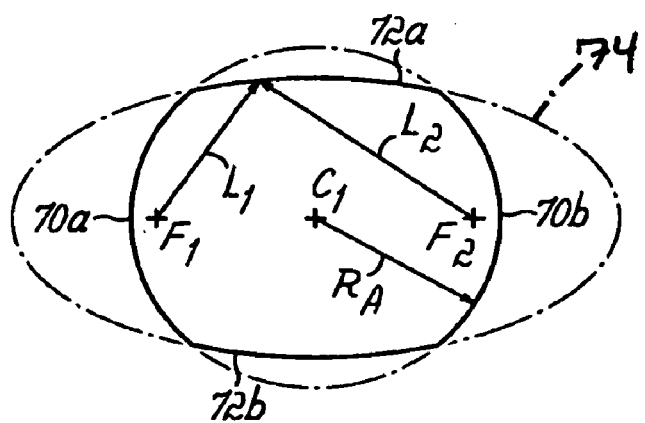
FIG. 10 is a schematic diagram depicting the shape of yet another exemplary objective lens of the present invention.

FIG. 10 is a schematic depiction of another construction of non-circular objective lens 34, 64. In this exemplary embodiment, the first oppositely disposed peripheral edges 70a, 70b of the objective lens 34, 64 are defined by circular arcs subscribed by a common radius Ra extending from a center C1 of the lens, as described above, and second, oppositely disposed peripheral edges 72a, 72b of the lens are defined by arcs coinciding with an elliptical shape 74 having first and second foci F1, F2, wherein the sum of the distances L1, L2 between the respective foci F1, F2 to any point on the second peripheral edges 72a, 72b is constant. Advantageously, the non-circular shape of the exemplary objective lens 34, 64 allows the weight of the optical loupes 12, 50 to be reduced, while maintaining a field of view having a width comparable to a magnification loupe with a circular objective lens. Furthermore, the arcuate shape of the second oppositely disposed peripheral edges 72a, 72b provides a reduction in objective lens size without degrading the optical

TABLE 2

Through-the-lens

| Element | Glass | $\eta_d$ | $v_d$ | Radius | Thickness | Max Diameter | Sep. |
|---|---|---|---|---|---|---|---|
| I | Schott NSK5 | 1.589 | 61.3 | $R_1 = \infty$<br>$R_2 = \infty$ | 2.2 | 12.0 | |
| II | Schott NBK7 | 1.517 | 64.2 | $R_3 = 36.49$<br>$R_4 = 18.48$ | 1.5 | 12.0 | $S_1 = 0.6$ |
| III | Schott NSF56 | 1.805 | 25.4 | $R_5 = 85.68$<br>$R_6 = 39.71$ | 1.6 | $D_1 = 22.24$<br>$D_2 = 23.60$ | $S_2 = 14.46$ |
| IV | Schott NBK7 | 1.517 | 64.2 | $R_7 = 39.71$<br>$R_8 = 21.55$ | 6.65 | $D_3 = 23.60$<br>$D_4 = 23.60$ | |

In Table 2, the radius, thickness, diameter, and separation dimensions are given in millimeters. Roman numerals identify the lens elements in their respective order from the eyepoint side to the object side. $\eta_d$ represents the refractive index of each element; $v_d$ is the abbe dispersion number; $R_1, R_2$, etc. represent the radii of the respective refractive surfaces in order, from the eyepoint side to the object side; $D_1, D_1$ etc. represent the maximum clear lens aperture diameters of the parent lens elements; and $S_1, S_2$ represent the air space between the elements, measured along the optical centerline.

quality of the magnification loupes 12, 50. The resulting loupe 12, 50 is light in weight and may be mounted in designer frames, which are generally smaller and lighter in weight than conventional frames for supporting magnification loupes. The non-circular shape also permits users to more easily view the true object by looking over the loupe housing 30, 52 as may be desired.

While the magnification loupes 12, 50 of the present invention have been shown and described having non-circular objective lenses 34, 64, it will be recognized that the loupes may be alternatively manufactured with circular lenses as shown in FIGS. 4A–4B. In particular, the optical loupe depicted in FIG. 4A is configured to be used with a flip-up mounting member 20, as described above for the magnification viewer of FIG. 1. The magnification loupe shown In FIG. 4B is configured to be mounted through the eyeglass lenses 18 of a magnification viewer 10a as described above with respect to FIG. 2. In FIGS. 4A–4B, features simllar to the features of magnification loupes 12, 50 of FIGS. 3A–38 are similarly numbered. Specifically, features 12a, 30a, 34a, and 50a, 54a, and 64a correspond to features 12, 30, 34 and 50, 54, and 64 shown and described with respect to FIGS. 3A and 3B.

The magnification loupes 12, 50 have been shown and described herein as being supported on a pair of spectacles. It will be recognized, however, that the loupes 12, 50 may alternatively be supported on other user wearable devices, such as headbands, facemasks, goggles, or other devices capable of supporting the loupes 12, 50 in close proximity to a users eyes.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

The invention claimed is:

1. A magnification loupe carried by a user wearable device, comprising:
 a housing having a first end with a first aperture for supporting an eyepiece lens, and a second end with a second aperture for supporting an objective lens;
 an eyepiece lens disposed in said first end of said housing; and
 an objective lens disposed in said second end of said housing;
 said objective lens having a non-circular shape, wherein at least two oppositely disposed arcuate first peripheral edges are defined by a first radius extending from a first center, and wherein at least two oppositely disposed arcuate second peripheral edges are defined by at least one second radius extending from at least a second center not coincident with said first center, said second radius having a length different from said first radius;
 said eyepiece lens comprising a single lens element;
 said objective lens comprising two lens elements;
 wherein said eyepiece lens and said objective lens are constructed and arranged according to the following parameters:

| Element | Glass | $\eta_d$ | $\nu_d$ | Radius | Thickness | Maximum Diameter | Sep. |
|---|---|---|---|---|---|---|---|
| I | Schott NSK5 | 1.589 | 61.3 | $R_1 = \infty$<br>$R_2 = \infty$ | 2.2 | 12.0 | |
| II | Schott | 1.517 | 64.2 | $R_3 = 36.49$ | 1.5 | 12.0 | $S_1 = 0.6$ |
| | NBK7 | | | $R_4 = 18.48$ | | | |
| III | Schott | 1.805 | 25.4 | $R_5 = 85.68$ | 1.6 | $D_1 = 22.24$ | $S_2 = 14.46$ |
| | NSF56 | | | $R_6 = 39.71$ | | $D_2 = 23.60$ | |
| IV | Schott | 1.517 | 64.2 | $R_7 = 39.71$ | 6.65 | $D_3 = 23.60$ | |
| | NBK7 | | | $R_8 = 21.55$ | | $D_4 = 23.60$ | | wherein the radius, thickness, and separation dimensions are given in millimeters; Roman numerals identify the lens elements in their respective order from an eyepoint side to an object side and element I is a representative correction lens; $\eta_d$ represents the refractive index of each element; $\eta_d$ is the abbe dispersion number; $R_1$–$R_8$ represent the radii of respective refractive surfaces in order, from the eyepoint side to the object side; $D_1$–$D_4$ represent the maximum clear lens aperture diameters of parent lens elements; and $S_1$, $S_2$ represent the air space between the elements, measured along an optical centerline.

2. A magnification loupe carried by a user wearable device, comprising:
 a housing having a first end with a first aperture for supporting an eyepiece lens, and a second end with a second aperture for supporting an objective lens;
 an eyepiece lens disposed in said first end of said housing; and
 an objective lens disposed in said second end of said housing;
 said objective lens having a non-circular shape, wherein at least two oppositely disposed arcuate first peripheral edges are defined by a first radius extending from a first center, and wherein at least two oppositely disposed arcuate second peripheral edges are defined by at least one second radius extending from at least a second center not coincident with said first center, said second radius having a length different from said first radius;
 said eyepiece lens comprising a single lens element;
 said objective lens comprising two lens elements;
 wherein said eyepiece lens and said objective lens are constructed and arranged according to the following parameters:

| Element | Glass | $\eta_d$ | $\nu_d$ | Radius | Thickness | Maximum Diameter | Sep. |
|---|---|---|---|---|---|---|---|
| I | Schott NSK5 | 1.589 | 61.3 | $R_1 = 98.19$<br>$R_2 = 98.19$ | 3.0 | 25.4 | |

-continued

| Element | Glass | $\eta_d$ | $v_d$ | Radius | Thickness | Maximum Diameter | Sep. |
|---|---|---|---|---|---|---|---|
| II | Schott NBALF4 | 1.580 | 53.9 | $R_3 = 52.10$ | 1.5 | $D_1 = 13.00$ | $S = 4.1$ |
|  |  |  |  | $R_4 = 20.16$ |  | $D_2 = 13.25$ |  |
| III | O'Hara STIH23 | 1.785 | 26.3 | $R_5 = 85.68$ | 1.8 | 26.15 | $S = 13.59$ |
|  |  |  |  | $R_6 = 43.17$ |  |  |  |
| IV | Schott NBK7 | 1.517 | 64.2 | $R_7 = 43.17$ | 7.6 | 26.15 |  |
|  |  |  |  | $R_8 = 22.39$ |  |  |  | wherein the radius, thickness, and separation dimensions are given in millimeters; Roman numerals identify the lens elements in their respective order from an eyepoint side to an object side and element I is a representative lens of the user wearable device; $\eta_d$ represents the refractive index of each element; $v_d$ is the abbe dispersion number; $R_1$–$R_8$ represent the radii of respective refractive surfaces in order, from the eyepoint side to the object side; $D_1$ and $D_2$ represent the maximum clear lens aperture diameters of parent lens elements; and $S_1$, $S_2$ represent the air space between the elements, measured along an optical centerline.

3. A magnification loupe carried by a user wearable device, comprising:
   a housing having a first end with a first aperture for supporting an eyepiece lens, and a second end with a second aperture for supporting an objective lens;
   a single element eyepiece lens disposed in said first end of said housing; and
   a two element objective lens disposed in said second end of said housing;
   said eyepiece lens and said objective lens constructed and arranged according to the following parameters:

| Element | Glass | $\eta_d$ | $v_d$ | Radius | Thickness | Maximum Diameter | Sep. |
|---|---|---|---|---|---|---|---|
| I | Schott NSK5 | 1.589 | 61.3 | $R_1 = \infty$ | 2.2 | 12.0 |  |
|  |  |  |  | $R_2 = \infty$ |  |  |  |
| II | Schott NBK7 | 1.517 | 64.2 | $R_3 = 36.49$ | 1.5 | 12.0 | $S_1 = 0.6$ |
|  |  |  |  | $R_4 = 18.48$ |  |  |  |
| III | Schott NSF56 | 1.805 | 25.4 | $R_5 = 85.68$ | 1.6 | $D_1 = 22.24$ | $S_2 = 14.46$ |
|  |  |  |  | $R_6 = 39.71$ |  | $D_2 = 23.60$ |  |
| IV | Schott NBK7 | 1.517 | 64.2 | $R_7 = 39.71$ | 6.65 | $D_3 = 23.60$ |  |
|  |  |  |  | $R_8 = 21.55$ |  | $D_4 = 23.60$ |  | wherein the radius, thickness, and separation dimensions are given in millimeters; Roman numerals identify the lens elements in their respective order from an eyepoint side to an object side and element I is a representative correction lens; $\eta_d$ represents the refractive index of each element; $v_d$ is the abbe dispersion number; $R_{1-R8}$ represent the radii of respective refractive surfaces in order, from the eyepoint side to the object side; $D_1$–$D_4$ represent the maximum clear lens aperture diameters of parent lens elements; and $S_1$, $S_2$ represent the air space between the elements, measured along an optical centerline.

4. A magnification loupe carried by a user wearable device, comprising:
   a housing having a first end with a first aperture for supporting an eyepiece lens, and a second end with a second aperture for supporting an objective lens;
   a single element eyepiece lens disposed in said first end of said housing; and
   a two element objective lens disposed in said second end of said housing;
   said eyepiece lens and said objective lens constructed and arranged according to the following parameters:

| Element | Glass | $\eta_d$ | $v_d$ | Radius | Thickness | Maximum Diameter | Sep. |
|---|---|---|---|---|---|---|---|
| I | Schott NSK5 | 1.589 | 61.3 | $R_1 = 98.19$ | 3.0 | 25.4 |  |
|  |  |  |  | $R_2 = 98.19$ |  |  |  |
| II | Schott NBALF4 | 1.580 | 53.9 | $R_3 = 52.10$ | 1.5 | $D_1 = 13.00$ | $S_1 = 4.1$ |
|  |  |  |  | $R_4 = 20.16$ |  | $D_2 = 13.25$ |  |
| III | O'Hara STIH23 | 1.785 | 26.3 | $R_5 = 85.68$ | 1.8 | 26.15 | $S_2 = 13.59$ |
|  |  |  |  | $R_6 = 43.17$ |  |  |  |
| IV | Schott NBK7 | 1.517 | 64.2 | $R_7 = 43.17$ | 7.6 | 26.15 |  |
|  |  |  |  | $R_8 = 22.39$ |  |  |  | wherein the radius, thickness, and separation dimensions are given in millimeters; Roman numerals identify the lens elements in their respective order from an eyepoint side to an object side; $\eta_d$ represents the refractive index of each element; $v_d$ is the abbe dispersion number; $R_1$–$R_8$ represent the radii of respective refractive surfaces in order, from the eyepoint side to the object side and element I is a representative lens of the user wearable device; $D_1$ and $D_2$ represent the maximum clear lens aperture diameters of parent lens elements; and $S_1$, $S_2$ represent the air space between the elements, measured along an optical centerline.

* * * * *

UNITED STATES PATENT AND TRADEMARK OFFICE
CERTIFICATE OF CORRECTION

PATENT NO. : 7,072,124 B2
APPLICATION NO. : 10/602128
DATED : June 24, 2003
INVENTOR(S) : Wilt et al.

It is certified that error appears in the above-identified patent and that said Letters Patent is hereby corrected as shown below:

IN THE SPECIFICATION

Title Page (74), Col. 2, reads "Wood Herron & Evans, LLP" and should read -- Wood, Herron & Evans, LLP -- .

Col. 2, lines 24-26, reads "...a first pair of...are defined by…, and a second pair of…are defined by…" and should read -- …a first pair of…is defined by…, and a second pair of…is defined by… -- .

Col. 4, line 20, table 1 headings, reads "…$\eta^d$… ; …$\upsilon_d$…; …Diameter…" and should read -- "…$\eta_d$…; …$\upsilon^d$…; …Max Diameter… -- .

Col. 4, line 30, reads "…are given in millimeters, Roman numerals…" and should read -- …are given in millimeters. Roman numerals… -- .

Col. 4, line 43, reads "…with minimal affect on the performance of…" and should read -- …with minimal effect on the performance of… -- .

Col. 5, line 64, reads "…$D_1$, $D_1$ etc. represent the…" and should read -- …$D_1$, $D_2$, etc. represent the… -- .

Col. 7, lines 10, reads "…features simillar to the…" and should read -- …features similar to the… -- .

Col. 7, line 11, reads "…of FIGS. 3A-38 are…" and should read -- …of FIGS. 3A-3B are… -- .

Col. 7, line 22, reads "…to a users eyes." and should read -- …to a user's eyes. -- .

UNITED STATES PATENT AND TRADEMARK OFFICE
CERTIFICATE OF CORRECTION

PATENT NO. : 7,072,124 B2
APPLICATION NO. : 10/602128
DATED : June 24, 2003
INVENTOR(S) : Wilt et al.

It is certified that error appears in the above-identified patent and that said Letters Patent is hereby corrected as shown below:

IN THE CLAIMS

Col. 8, line 25-26, claim 1, reads "...$\eta_d$ is the abbe dispersion number..." and should read -- ...$v^d$ is the abbe dispersion number... -- .

Col. 9, lines 4 and 6, claim 2, reads "...S= 4.1...; ...S= 13.59..." and should read -- ...$S_1$=4.1...; $S_2$=13.59... -- .

Signed and Sealed this

Second Day of January, 2007

JON W. DUDAS
*Director of the United States Patent and Trademark Office*

UNITED STATES PATENT AND TRADEMARK OFFICE
CERTIFICATE OF CORRECTION

PATENT NO. : 7,072,124 B2
APPLICATION NO. : 10/602128
DATED : July 4, 2006
INVENTOR(S) : Wilt et al.

It is certified that error appears in the above-identified patent and that said Letters Patent is hereby corrected as shown below:

IN THE SPECIFICATION

Title Page (74), Col. 2, reads "Wood Herron & Evans, LLP" and should read -- Wood, Herron & Evans, LLP -- .

Col. 2, lines 24-26, reads "…a first pair of…are defined by…, and a second pair of…are defined by…" and should read -- …a first pair of…is defined by…, and a second pair of…is defined by… -- .

Col. 4, line 20, table 1 headings, reads "…$\eta^d$… ; …$\upsilon_d$…; …Diameter…" and should read -- "…$\eta_d$…; …$\upsilon^d$…; …Max Diameter… -- .

Col. 4, line 30, reads "…are given in millimeters, Roman numerals…" and should read -- …are given in millimeters. Roman numerals… -- .

Col. 4, line 43, reads "…with minimal affect on the performance of…" and should read -- …with minimal effect on the performance of… -- .

Col. 5, line 64, reads "…$D_1$, $D_1$ etc. represent the…" and should read -- …$D_1$, $D_2$, etc. represent the… -- .

Col. 7, lines 10, reads "…features simillar to the…" and should read -- …features similar to the… -- .

Col. 7, line 11, reads "…of FIGS. 3A-38 are…" and should read -- …of FIGS. 3A-3B are… -- .

Col. 7, line 22, reads "…to a users eyes." and should read -- …to a user's eyes. -- .

UNITED STATES PATENT AND TRADEMARK OFFICE
CERTIFICATE OF CORRECTION

PATENT NO. : 7,072,124 B2
APPLICATION NO. : 10/602128
DATED : July 4, 2006
INVENTOR(S) : Wilt et al.

It is certified that error appears in the above-identified patent and that said Letters Patent is hereby corrected as shown below:

IN THE CLAIMS

Col. 8, line 25-26, claim 1, reads "...$\eta_d$ is the abbe dispersion number..." and should read -- ...$v^d$ is the abbe dispersion number... -- .

Col. 9, lines 4 and 6, claim 2, reads "...S= 4.1...; ...S= 13.59..." and should read -- ...$S_1$=4.1...; $S_2$=13.59... -- .

This certificate supersedes Certificate of Correction issued January 2, 2007.

Signed and Sealed this

Sixth Day of February, 2007

JON W. DUDAS
*Director of the United States Patent and Trademark Office*